Jan. 16, 1968 R. E. HARRINGTON ETAL 3,363,588
FEED CONTROL MEANS FOR FORAGE CROP WAFERING MACHINE
Filed Jan. 23, 1963 4 Sheets-Sheet 1
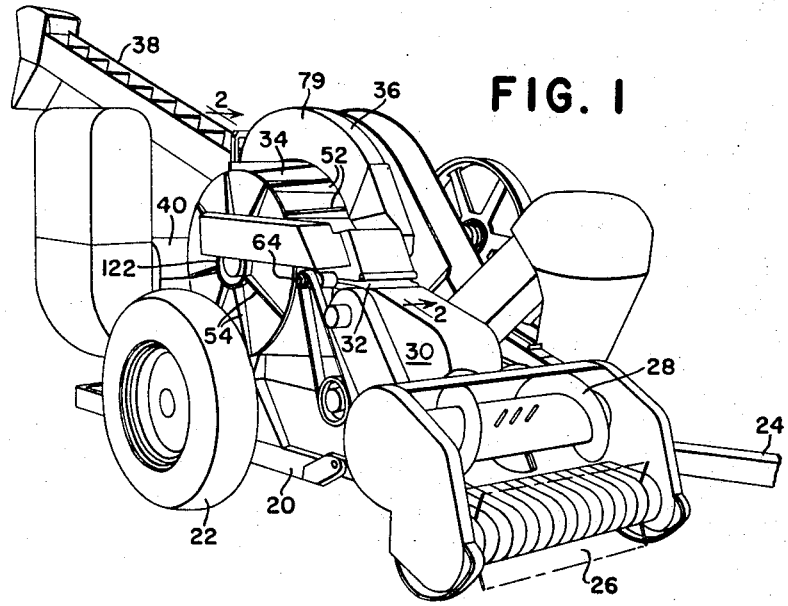
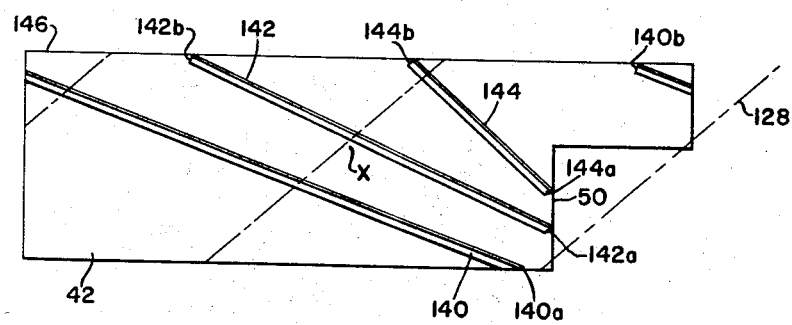
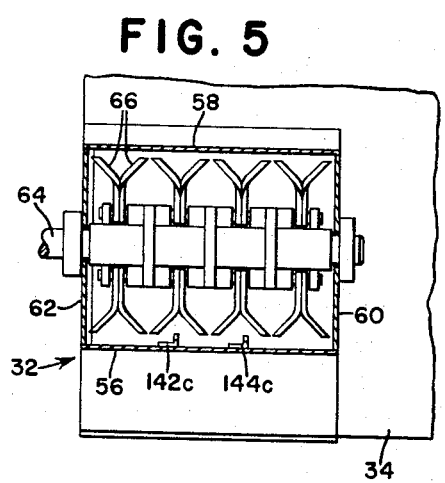
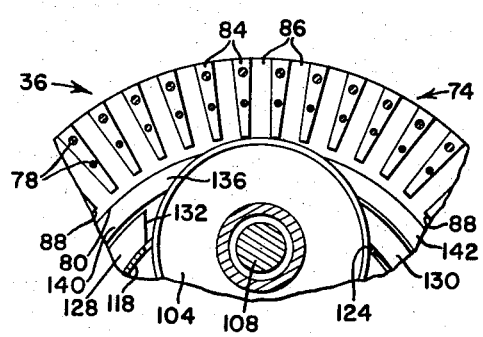
INVENTORS
R. E. HARRINGTON
W. M. ROLL
G. W. SONNENBURG
H. W. BUNTENBACH
M. W. FORTH Jan. 16, 1968  R. E. HARRINGTON ETAL  3,363,588
FEED CONTROL MEANS FOR FORAGE CROP WAFERING MACHINE
Filed Jan. 23, 1963  4 Sheets-Sheet 2

INVENTORS
R. E. HARRINGTON
W. M. ROLL
G. W. SONNENBURG
H. W. BUNTENBACH
M. W. FORTH

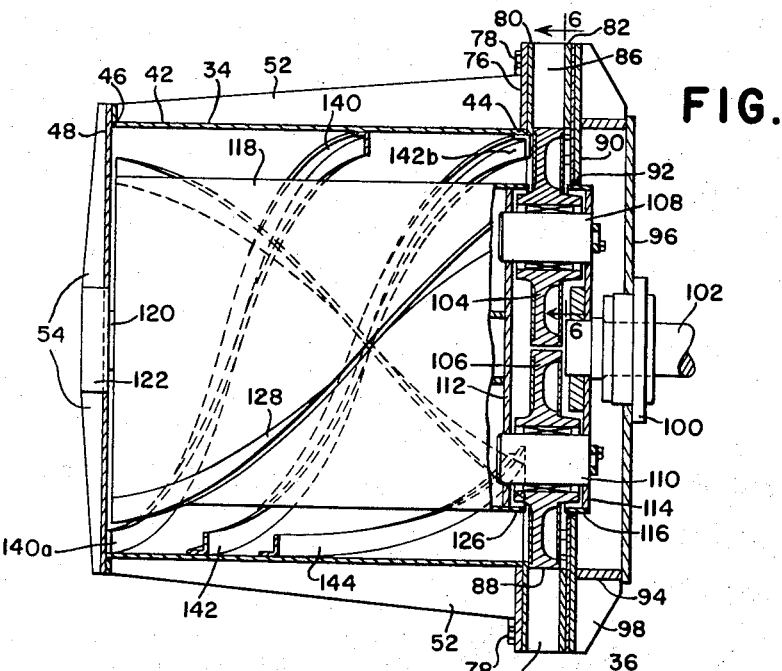
FIG. 4
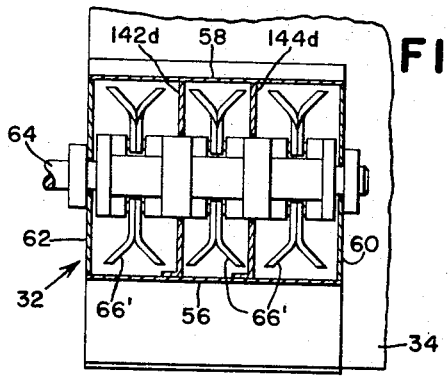
FIG. 9
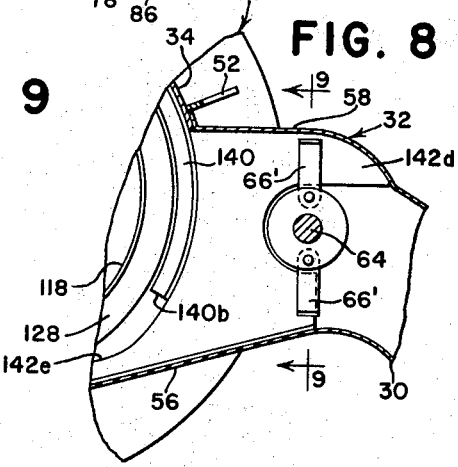
FIG. 8
FIG. 13
INVENTORS
R. E. HARRINGTON
W. M. ROLL
G. W. SONNENBURG
H. W. BUNTENBACH
M. W. FORTH Jan. 16, 1968   R. E. HARRINGTON ETAL   3,363,588
FEED CONTROL MEANS FOR FORAGE CROP WAFERING MACHINE
Filed Jan. 23, 1963                              4 Sheets-Sheet 4

INVENTORS
R. E. HARRINGTON
W. M. ROLL
G. W. SONNENBURG
H. W. BUNTENBACH
M. W. FORTH

United States Patent Office 3,363,588
Patented Jan. 16, 1968

3,363,588
FEED CONTROL MEANS FOR FORAGE CROP WAFERING MACHINE
Roy E. Harrington and Walter M. Roll, Moline, Ill., and George W. Sonnenburg, Orion, Ill., Herbert W. Buntenbach, Davenport, Iowa, and Murray W. Forth, Moline, Ill., assignors to Deere & Company, Moline, Ill., a corporation of Delaware
Filed Jan. 23, 1963, Ser. No. 253,410
6 Claims. (Cl. 107—14)

This invention relates to a wafering machine for wafering forage crops and the like, and more particularly to feed control means for improving the performance of the die means.

A forage crop wafering machine is to be distinguished from the conventional hay baler in at least two important aspects; namely, it operates at considerably higher pressures, and it provides products in the form of wafers that are considerably smaller than bales, are denser than bales and are therefore easier to handle for purposes of feeding, storage and transport. Like a baler, however, the machine is designed primarily for mobility so as to be capaable of operating in a field of previously harvested and windrowed crops.

Such machine also differs significantly from the conventional pellet mill which normally handles relatively finely ground material in which the moisture content is substantially uniform, since it has been pretreated. As opposed to this, a wafering machine, and particularly a field wafering machine, encounters material in which the moisture content varies from field to field and even from windrow to windrow, and this problem is especially aggravated when field patches of different materials are encountered.

One of the most successful approaches to the wafering problem has been a machine including an annular die having a plurality of uniformly circumferentially spaced cells radiating from an inner periphery or track over which one or more press wheels roll to extrude the material outwardly through the die cells for ultimate receipt by a conveyor or the like. It is known to feed the die track by an auger coaxial with the axis of the annulus and track, and it is also known that the auger flights must be timed or otherwise related to the press rolls so as to feed the material into the track just ahead of the press rolls. In a typical construction, the common axis of the die and auger will be horizontal, and it is found that the tendency of the material to gravitate to the bottom of the auger housing carries over into a tendency to gravitate to the lower portion of the die ring, with the result that the wafers were not extruded uniformly from the full circle of dies. That is to say, wafers were being formed largely in the lower sector of the annulus rather than uniformly throughout its circumferential extent. It was found in some cases, depending upon material, that the feed was inadequate to the die cells because of the tendency of the material to rotate without moving axially, except at lower portions of the structure, again aggravating the problem of extruding from only the lower portion of the die.

According to the present invention, these problems are eliminated by the provision of novel structure for controlling the material so that it is distributed evenly to the die whereby the extrusion rate is substantially uniform throughout the full circumferential extent of the die. It is an object of the invention to arrange rotary and fixed means in cooperative relationship within the feed housing so as to effect proper conveying of the material. More specifically, it is an object of the invention to utilize means within the feed housing for distributing the material to different circumferential portions of the die. Another object of the invention is to associate the distributing means with the feed opening to the feed housing in such manner that the incoming crops are in effect separated into different streams, which streams are guided to circumferentially different portions of the die.

The foregoing and other important objects and desirable features inherent in an encompassed by the invention will become apparent as preferred embodiments of the invention are disclosed in detail in the ensuing description and accompanying sheets of drawings, the figures of which are described below.

FIG. 1 is a perspective of a representative type of field wafering machine.

FIG. 4 is a section as seen along the line 4—4 of FIG. 2.

FIG. 5 is a section as seen along the line 5—5 of FIG. 2.

FIG. 6 is a fragmentary section as seen along the line 6—6 of FIG. 4.

FIG. 7 is a developed or "unrolled" view of the feed housing, drawn to a smaller scale.

FIG. 8 is a view similar to a portion of the righthand part of FIG. 2 but showing a modified form of construction.

FIG. 9 is a section on the line 9—9 of FIG. 8.

FIG. 13 is a similar "unrolled" view of another form of feed housing, drawn to the scale of FIGS. 7 and 12.

Figure 2:
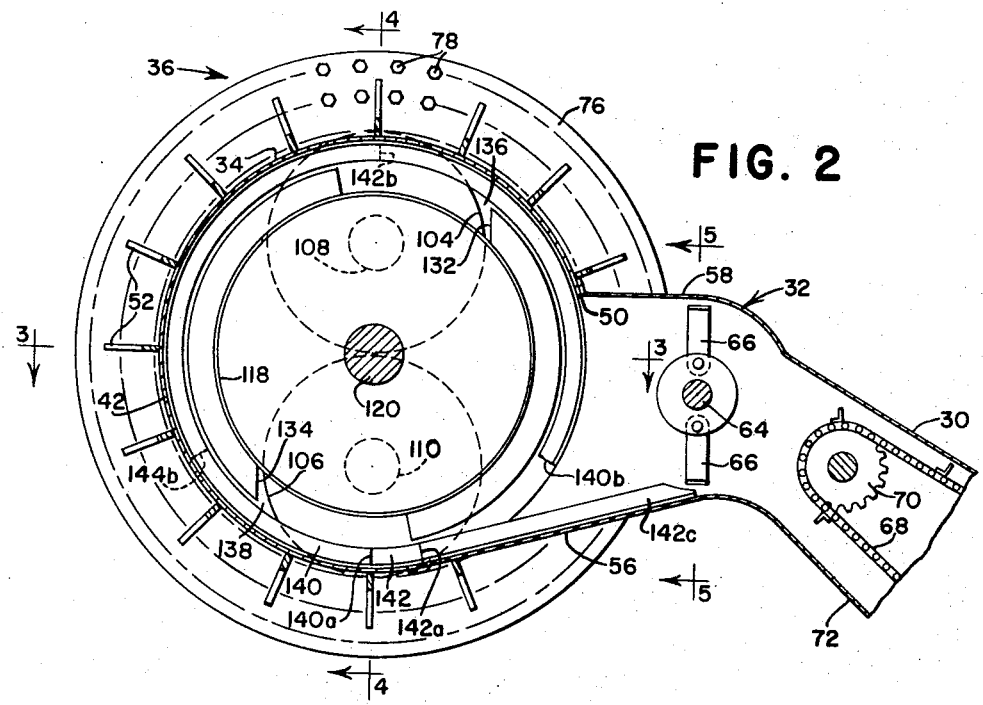
FIG. 2 is an enlarged fragmentary section as seen generally along the line 2—2 of FIG. 1.

The machine chosen for purposes of illustration is here of the type that may be drawn by a tractor or other vehicle (not shown) and therefore comprises a mobile support means or frame 20 carried on wheels 22 (only one of which is shown). A forward portion of the frame or support means 20 includes a draft tongue 24 by means of which the machine may be connected to a draft vehicle. The direction of travel is toward the right as seen in FIG. 1, and the support means carries at its forward portion a typical pickup means 26 which operates to deliver windrowed forage crops upwardly and rearwardly to a reversely wound pre-compressing auger 28 which in turn delivers the material rearwardly to a feeder house 30. The material is thence delivered rearwardly through a preliminary external feeding means 32 to a feed housing 34 and thence axially of this housing—toward the left-hand side of the machine—into the wafering means, which is located in the general area of the numeral 36 in FIG. 1. In a manner to be described below, wafers are formed and discharged ultimately to a conveyor 38 for receipt by a trailing wagon (not shown) conventionally employed with vehicular trains of this type. The machine may be powered by any suitable source of power, such as an internal combustion engine, designated generally here at 40.

The feed housing 34 is here shown as of relatively elongated cylindrical construction, having a peripheral wall 42 rigidly secured at one end 44 to the wafering means 36 and closed at its opposite end 46 by a radial end wall 48. Except in the area occupied by a feed opening 50, the housing is externally reinforced by appropriate axial ribs at 52 and radial ribs at 54. The feed opening 50 has upper and lower edges generally parallel to the main axis of the housing 34 and the area of the opening is such that it occupies substantially the lower forward one quarter of the circumference of the housing. Stated otherwise, the feed opening may be said to occupy the area between substantially "three o'clock" and "six o'clock."

The feed means 32, which is external to the interior of the housing, comprises a floor 56 which slopes downwardly and rearwardly and joins the lower edge of the feed opening 50, being substantially tangential to the circumference of the housing 34. The feed means 32 additionally has a top or upper wall 58 which is spaced somewhat above the fore-and-aft horizontal diameter of the housing 34. In addition to this, the means 32 has opposite upright side walls 60 and 62 (FIG. 5).

Carried within the housing afforded by the external feeding means 32, and forming part thereof, is a rotary device comprising a central rotor or shaft 64 on which is mounted a plurality of axially spaced arms 66 which stand out radially when the device rotates, the direction of rotation here being clockwise as seen in FIG. 2. The shaft extends exteriorly to the right of the means 32 and may be driven in any suitable manner, as shown in FIG. 1. The feeder house 30 contains a raddle feeder 68 carried at its upper end on a pair of sprockets 70, the direction of rotation of which is clockwise as seen in FIG. 2. The forage crop material picked up at 26 and augered at 28 to the raddle 68 is conveyed upwardly by the lower run of the raddle, between said run and an upwardly and rearwardly inclined floor 72, at which locus it is transferred to the rotary means 64–66 for delivery through the feed opening 50 to the interior of the housing 34. Here again, any suitable means may be utilized for driving the feeder or raddle 68.

Figure 3:
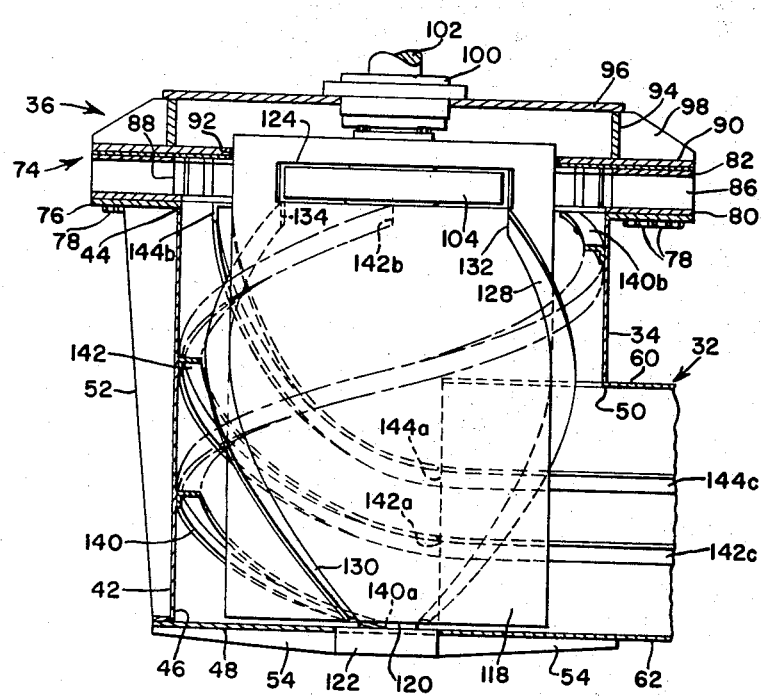
FIG. 3 is a section as seen along the line 3—3 of FIG. 2.

By means to be subsequently described, the forage crop material fed to the interior of the housing is moved axially thereof to the wafering means 36, it being noted that the feed opening 50 is offset axially from the wafering means (FIGS. 3 and 4). The wafering means comprises die means in the form of an annulus 74 to one side of which the housing 34 is coaxially secured, as by means of a ring 76 welded to the housing 34 at 44 and bolted to the annulus as at 78. The details of this phase of the structure are enclosed by a shield 79 in FIG. 1.

The annulus may be regarded as being made up of first and second coaxially spaced apart rings 80 and 82 and a plurality of uniformly circumferentially spaced generally wedge-shaped die blocks 84 which afford a like plurality of radial die cells 86, the inlet ends of which are located on what may be regarded as an inner peripheral track 88. The bolts 78, previously described may be utilized to hold the die blocks in place between the rings 80 and 82. The inner ring 80 has an inside diameter substantially equal to that of the interior surface of the feed housing 34, and the other plate 82 has a similar internal diameter but is supplemented by a plate or ring 90 (FIGS. 3 and 4) which has a central circular opening 92 of a still smaller diameter, the purpose of which will be described later. To the lefthand side of the machine (to the right as seen in FIG. 4; to the top as seen in FIG. 3) the wafering means 36 is supplemented by supporting structure which may be regarded as part of the main frame or support means 20. This support structure here takes the form of a peripheral ring 94 welded or otherwise rigidly secured to the supplementing plate 90 and closed at its end in axially spaced relation to the annulus 74 by a radial plate 96. The plate 96 may be welded to the ring 94 and the whole may be further reinforced by gussets 98. It will be noted that the radial length of the die blocks 84 is such that their inner ends terminate radially outwardly of the inner diameters of the plates 80 and 82, thus affording some "depth" to the track 88.

The supporting structure 94–96–98 carries centrally thereof a bearing 100 in which is supported an input shaft 102. In the present environment, this shaft extends toward the left-hand side of the machine and is driven by the internal combustion engine 40, which details are not material here, except to observe that the shaft rotates in a clockwise direction as seen in FIG. 2.

The theory of operation of a wafering machine of the type disclosed here is that means is provided for extruding the forage crops radially outwardly through the die cells 86, from which the compacted or extruded crops emerge as wafers, having a cross sectional dimension determined by the cross sectional area of the die cells and lengths of random amounts, depending upon whether or not means is provided for breaking off the extrusions as they emerge from the die cells. In the present case, the die cells may be regarded as 2 x 2 x 6 inches; although variations may be exploited in ranges above and below those indicated. Suffice it to note that the dimensions are such that the wafer is a relatively dense, compact product, therefore requiring substantially high pressures in the formation thereof. The means for effecting extrusion of the forage products through the die cells here takes the form of a pair of press wheels 104 and 106, mounted respectively on press roll shafts 108 and 110 at diametrically opposite sides of the axis of the annulus, which is of course the axis of the housing 34 as well as that of the shaft 102. The axes of the shafts 108 and 110 are of course eccentric to the annulus axis, and the press wheels are of such diameter that their peripheries roll substantially about the track 88; although, of course, there is an operational clearance provided so that the rolls do not exactly contact the inner ends of the die blocks 84. The press roll assembly is carried for orbital movement about the track by carrier structure including inner and outer plates or cheeks 112 and 114, the latter of which is rigidly secured to the shaft 102, being of circular construction and bounded by an integral or otherwise rigidly affixed ring 116 which operates with relatively close running clearance within the circular opening 92 previously described as existing in the supplemental plate 90. This provides in effect a seal for preventing axial escape of forage crops to the right as seen in FIG. 4. The two press wheel shafts 108 and 110 are preferably rigidly secured to the cheeks or plates 112 and 114 so that they afford supporting structure for the other plate 112, which is likewise circular so as to afford a support for the rigid affixation thereto of an auger core or tube 118, which affords part of rotary means within the housing for accomplishing controlled feeding of the forage crops from the feed opening to the annulus 74. The end of the auger tube or core 118 proximate to the annulus 74 or track 88 represents an end which is adjacent to the inner end 44 of the housing 34. The opposite end of the auger tube rigidly carries a supporting shaft 120, coaxial, of course, with the shaft 102, and journaled in a suitable bearing 122 in the housing end wall 48. The auger tube 118 in its area within the track 88 is cut out at 124 and 126 to accommodate the press wheels 104 and 106 respectively.

As a matter of structural detail, not material here, it may be observed that the auger tube 118 may be rigidly secured to the carrier plate 112 in any suitable manner, which is also true of the connection between the tube 118 and the shaft 120 opposite to the input shaft 102. Likewise, it should be noted that the shaft 120 appears in FIG. 2 because the plane of the section passes just inside the outer wall as represented by the plane of the wall 62 in FIG. 3. It might also be noted at this point that the two press rolls could be replaced by a single larger one.

The rotary means comprising the tube or core 118 is supplemented by material-engaging means including one or more blade-like elements, here two being employed at 128 and 130, diametrically opposed on the core 118 and each extending axially as well as circumferentially so as to partake of the nature of part of a helix about the axis of the tube. As best seen in FIG. 3, the element or flight 128 has a terminal end portion 132 lying just ahead (clockwise) of the press wheel 104. The terminal end of the flight or element 130 lies, at 134, just ahead or clockwise of the other press wheel 106. This will also be seen in FIGS. 2 and 6, in the latter case particularly as respects the terminal end 132 of the flight 128. The explanation for this will be best understood from FIG. 6 wherein it will be shown that, as respects the point of tangency between the press wheel 104 and the track 88, there is a feed-receiving "crescent" 136 ahead of the press wheel 104. In FIG. 6, this crescent will be counterclockwise of the press wheel 104, since FIG. 6 is seen from the side opposite FIG. 2, wherein the crescent 136 will appear in a clockwise direction from the press roll 104. A similar crescent 138 exists diametrically opposite the crescent 136 and occurs clockwise of the other press wheel 106. One of the basic principles of operation is that the rotary means 118–128–130 will function to move material axially to the track, the terminal ends 132 and 134 of the elements or flights 128 and 130 serving to distribute the material respectively ahead of the press rolls or wheels so that these wheels may compact the material into the die cells for ultimate extrusion therethrough as wafers.

Experience has shown, however, that a rotary device such as an auger alone will result in uneven distribution of the material to the track, because of the effects of gravity. It is common knowledge that an auger will tend to move the material without substantial rotation, particularly in dry and fluent material. On the basis of that approach, it follows then that the material in this case would, without more, be delivered primarily to the lower portion of the annulus, particularly in that portion thereof represented by the area between "six o'clock" and "eight o'clock." Little of the material would be forced into the remaining die cells, resulting in obvious disadvantages. The primary functional disadvantage is poor wafer quality due to variations in wafer density resulting from extreme variations of time in the die. Premature wear and other durability problems would arise from continual uneven feeding.

According to the present invention, this problem is eliminated, basically, by providing means for distributing the material relatively uniformly to the die track; or at least, distributing the material so that the upper die cells are utilized to substantially the same extent as the lower cells. In general, the basic idea may be said to reside in providing a continuous flow of material to each press roll via guiding the incoming material along adjacent paths to each of the circumferentially different portions of the track. Stated otherwise, the invention adds to the rotary means 118–128–130 fixed means for effecting rotation of the material so as to effect uniform distribution to the track.

In that form of the invention shown in FIGS. 1–7, the approach takes the form of fixed means utilizing one or more blade-like elements or ribs at least partially embracing the rotary means and extending substantially from end to end of the interior of the feed housing 34 so as to accomplish the desired result. Specifically, this means includes three spiral or at least helical ribs 140, 142 and 144. All of these ribs start generally in the area of the lower edges of the feed opening 50, as shown at 140a, 142a and 144a in FIG. 7. However, these ribs have different termini, the rib 140 terminating at 140b, and ribs 142 and 144 terminating respectively at 142b and 144b. In FIG. 7, the line 146 at the top of the figure represents the radial plane at the junction of the housing end 44 and the track 88. It will be noted, therefore, that the termini 140b, 142b and 144b lie at this plane. Since the ribs are of different circumferential lengths and since they extend in substantially the same axial direction and in the same axial amount, it follows that certain of them will extend through a greater number of degrees than the others. For example, the rib 140 is the longest, making almost a complete revolution as it extends axially from the feed opening to its terminus 140b. That is why, in FIG. 7, the terminus 140b is seen at the opposite end, since the "unrolled" wall 42 is 360° in length, but the rib 140, starting at 140a, lacks a substantial portion of this length at the feed opening and therefore occupies the portion beyond the feed opening. This will be clear from the illustration in FIG. 3, wherein the portions of the ribs overlying the rotary means 118–128–130 are shown in dot-dash lines.

Stated otherwise, and using another approach, it may be said that all of the ribs start substantially at "six o'clock," with the rib 140 terminating at 140b at approximately "four o'clock," the rib 142 terminating at 142b at "twelve o'clock" and the rib 144 terminating at 144b at substantially "eight o'clock." Variations in termini will of course depend upon factors such as speeds of rotation, lead of the flights 128 and 130 on the auger, number of press wheels involved etc. However, having the principles of the invention available, these can be determined empirically.

Looking again at FIG. 7, it will be seen that another feature is significant: that is, that the angle and lead of the flights 128 and 130 are chosen so that these cross the ribs 140, 142 and 144 at such angles that the components of axial and circumferential movements are substantially equal. This assures that the material will rotate as well as move axially, which leads to the substantially uniform distribution of forage crop material obtained at the track. In FIG. 7, the auger flight 128 is chosen for purposes of illustration and is indicated by the inclined dot-dash line. In the present case, on the basis of selected speed of the rotary means and diameter of the core 118, together with the inside diameter of the auger housing wall 42, each flight 128 and 130 progresses less than halfway around the tube 118 as it extends axially of the length of the tube. By way of example, the outside diameter of the core 118 may be on the order of 24 inches, with the die track 88 having a diameter of 36 inches. The interior diameter of the housing 34 is 34 inches, and each of the press wheels has a diameter of 17 inches. Using ribs such as those shown at 140, 142 and 144 of a radial dimension of 1½ inches and allowing for a clearance between the flights 128 and 130 and the ribs 140, 142 and 144, the flights may have a 96 inch lead with a core length of approximately 30 inches. The flights 128 and 130, as they cross the center rib 142 will intersect same at an angle of approximately 115° as shown by the letter $x$ in FIG. 7. It will also be noted that the spiral ribs or bars 140, 142 and 144 are wound in the direction opposite to the direction of rotation of the rotary means 118–128–130.

A still further feature of the invention is shown best in FIGS. 2, 3 and 5, in which the bars 142 and 144 are provided respectively with extensions 142c and 144c, which extensions project outwardly over and are secured to the floor 56 of the external feeding means 32. These extensions are instrumental in splitting the incoming crop stream into three narrower streams, and these streams are guided by the spiral bars or ribs to the track means for even distribution therein. To further augment the movement of the crop through the feed opening, the extensions 142c and 144c are arranged in cooperative relationship with the hammers or arms 66 on the rotor shaft 64, as best depicted in FIG. 5, wherein it will be seen that the arms 66 are so shaped as to operate astride the extensions.

A modification of this feature is illustrated in FIGS. 8 and 9 wherein the extensions are in the form of upright walls 142d and 144d, each of which extends from the floor 56 to the top 58 of the external feeding means 32. The spacing of the walls is associated with the arms 66' (here modified over the arms 66 in FIG. 5) so that each set of arms operates in a separate compartment afforded in the feeding means 32 by the wall-like extensions 142d and 144d. As seen in FIG. 8, the extensions may be cut out to accommodate central portions of the rotor. Likewise, each of the extensions may be shaped particularly as shown at 142e so as to clear the auger flights in the area of the feed opening.

Before proceeding with the description of further approaches to the problem, it might be well to observe that if one press wheel were used, the rotary means would include one blade-like element, preferably discharging to the crescent ahead of the single press roll. Experience has shown, also, that it is preferred to utilize an odd number of ribs where an even number of press rolls is used, because this avoids "cycling" of the machine at peak loads. Thus, the example already given utilizes the two press wheels 104 and 106, two auger flights 128 and 130, and three ribs 140, 142 and 144. As will be shown below, however, other variations are available, all within the spirit and scope of the invention.

Figure 10:
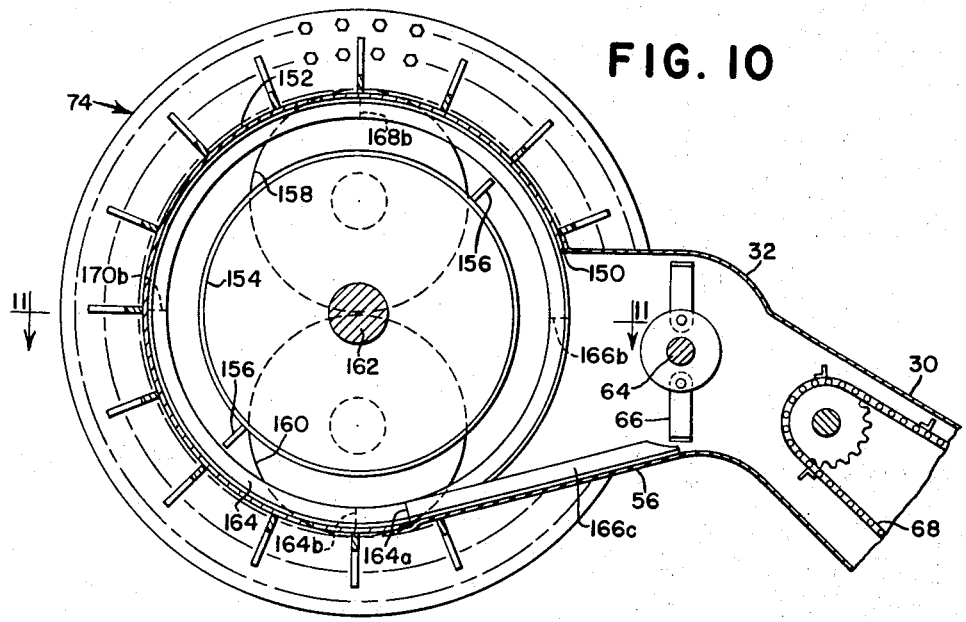
FIG. 10 is a view similar to FIG. 2 but showing a further modified form of construction.
Figure 11:
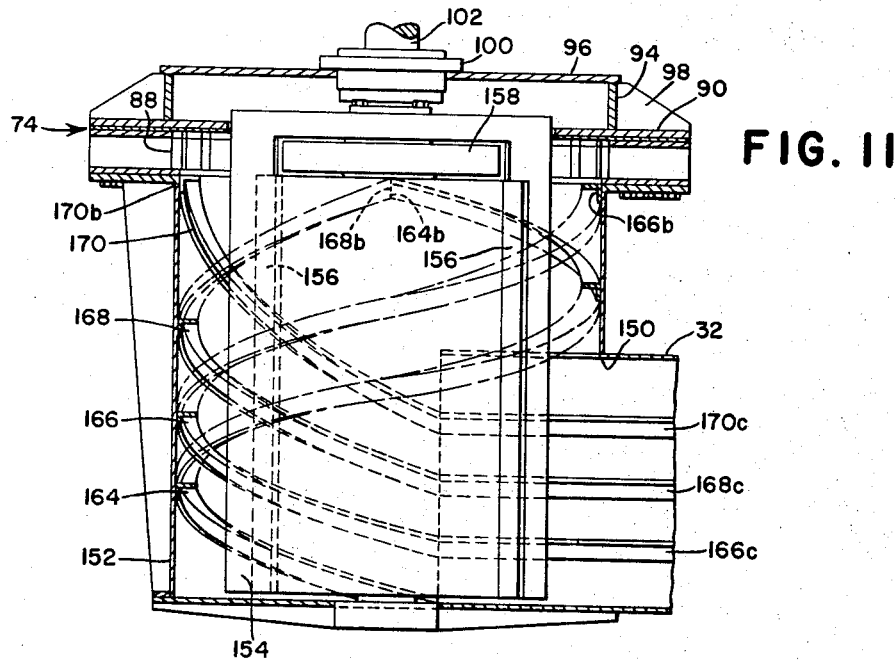
FIG. 11 is a section on the line 11—11 of FIG. 10.
Figure 12:
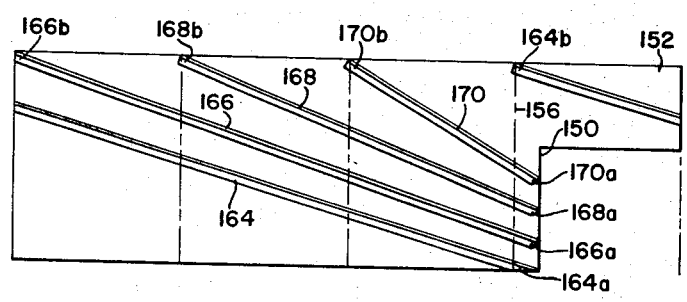
FIG. 12 is a reduced developed or "unrolled" view of the feed housing of FIGS. 10 and 11.

In FIGS. 10–12, the general basic structure will be recognized, such as the feeder house 30, feeding means 32 with its rotor shaft 64 and arms 66, together with the raddle feeder 68 for feeding material via the rotor 64–66 through a feed opening 150 in a feed housing 152 which leads axially to a die means 74. It will be clear that this die is similar to that previously described and repetition of the description will be avoided. Likewise, the housing 152 may be similarly associated with the die as well as with a core 154 of coaxial rotary means which is supplemented by one or more external blade-like elements 156, uniformly circumferentially distributed about the periphery of the core and running axially of the core. Also visible in this modification are two press wheels 158 and 160 which correspond structurally and functionally to those previously described. Duplication of the supporting structure will be recognized at 90, 94, 96 and 98, as will the bearing 100 for the input shaft 102, it being clear that the core 154 is appropriately journaled coaxially at its other end by a stub shaft 162.

The basic distinction between this modification and that previously described is that the core 154 has the straight lengthwise-running blades 156 instead of partially helical blades. However, like the previous embodiment, the present structure includes fixed means cooperative with the rotary means 154–156 for controlling the flow of forage crop material to the track 88 of the die means 74. In this case, the fixed means comprises a plurality of at least partially helical ribs or bars 164, 166, 168 and 170. These all start at the feed opening 150 in uniformly axially spaced apart relation, as at 164a, 166a, 168a and 170a, which again is in the general area of "six o'clock." Since the ribs have equal axial spacing and since they extend different circumferential distances, it follows that they have different leads, so that their termini occupy different circumferential locations at the junction of the feed housing 152 with the track 88, which termini are shown respectively at 164b, 166b, 168b and 170b, it being observed that the rib 164 is the longest and the rib 170 is the shortest. According to the illustrated design, the termini are 90° apart at the junction of the housing 152 with the die 74; that is, they lie respectively at "three, six, nine and twelve o'clock." Considered with respect to the starting point of 164a just short of "six o'clock," it will be seen that the rib 164 extends through somewhat more than 360°. The blade element 156 is shown schematically by dot-dash lines in FIG. 12 to illustrate its crossing relationship to the ribs. Again, because of the circumferential length of the rib 164, the terminal end 164b thereof appears beyond the feed opening in FIG. 12. The theory of operation here is that the rotary means 154–156, upon receiving material from the external feeding means 32, will rotate this material within the interior of the feed housing 152, and the spiral ribs will control the material so as to cause the material to move axially in separated paths for distribution at the 90° intervals in the track 88.

As in the previous embodiment, three of the ribs are provided with extensions 166c, 168c and 170c, which extensions overlie the floor 56 of the external feeding means 32 for cooperation with the rotary means 64–66 in the same manner as previously described.

A further variation is shown in FIG. 13 in which the housing wall, here designated by the numeral 172, is provided with a plurality of ribs 174, 176, 178 and 180, all originating at the feed opening 182 and having the same spacing and lead so that, in the developed view, they lie parallel to each other. Here again, the ribs are arranged so that their terminal ends meet the junction of the housing and die means track at uniformly circumferentially spaced apart intervals, here 90°. The rib 174 is the longest and makes more than one turn about the interior of the annular wall 172 as it progresses axially toward and terminates at the aforesaid junction, and because of this the feed opening 182 is of trapezoidal shape so that as this rib winds about the interior of the wall 172, it does not cross the feed opening 182 as it would were the opening rectangular. The rib 174, as seen in FIG. 13, terminates at 174b at the junction of the housing and die means. The terminal ends of the other ribs lie respectively at 176b, 178b and 180b.

By way of illustration, dot-dash lines are utilized here to represent one of the blades 156 on the rotary means of FIGS. 10 and 11, it being clear that the wall of FIG. 12 can be substituted for that of FIG. 13, and that either of these can be substituted for the wall of FIGS. 1–9.

It will be further clear that the ribs in FIG. 13 could be provided with extensions such as those previously described and that these extensions will cooperate with the external feeding means. The purpose of the external feeding means is not so much to chop up the material as to mix the stems and leaves and to orient the stems for easier feeding. It follows that the basic concept of the invention may be exploited without the external feed means.

Features and advantages other than those enumerated will readily occur to those versed in the art, as will many modifications and alterations in the preferred embodiments disclosed, all of which may be achieved without departure from the spirit and scope of the invention.

What is claimed is:

1. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; crop control structure in the housing for feeding such crops axially to the track, including rotary means rotatable in the housing generally coaxially with the track and extending substantially from said feed opening to the first end of said housing, said rotary means having at least one blade element thereon extending axially thereof and projecting radially in annularly spaced relation to the interior surface of said annular wall, and fixed means secured to the interior surface of said wall in at least partially embracing relation to said rotary means, said fixed means including a plurality of elements spaced apart circumferentially and extending lengthwise of said housing in at least partly spiral fashion in the direction of rotation of said rotary means and terminating at the track in circumferentially spaced apart relation, certain of said elements extending circumferentially as well as axially, said two means of the crop control structure cooperating to cause forage crops to rotate as well as to move axially in the housing for effecting relatively even distribution of such crops to the track substantially throughout its annular extent; said feed opening having a lower edge adjacent to the bottom of the housing; and external feeding means including a bottom wall leading to said feed opening lower edge, and said fixed elements having extensions extending through the feed opening and onto said bottom wall in spaced apart relation axis-wise of the housing so as to divide incoming crops.

2. The invention defined in claim 1, in which: the external feeding means includes a rotary device journaled on an axis above said floor and parallel to the housing axis, said device having radial arms spaced axially thereon to operate between said extensions.

3. The invention defined in claim 2, in which: the external feeding means has a top spaced above the rotary device, and said extensions are in the form of upright walls extending from said floor to said top.

4. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; crop control structure in the housing for feeding such crops axially to the track, including rotary means rotatable in the housing generally coaxially with the track and extending substantially from said feed opening to the first end of said housing, said rotary means having at least one blade element thereon extending axially thereof and projecting radially in annularly spaced relation to the interior surface of said annular wall, and fixed means secured to the interior surface of said wall in at least partially embracing relation to said rotary means, said fixed means including a plurality of elements spaced apart circumferentially and extending lengthwise of said housing in at least partly spiral fashion in the direction of rotation of said rotary means and terminating at the track in circumferentially spaced apart relation, certain of said elements extending circumferentially as well as axially, said two means of the crop control structure cooperating to cause forage crops to rotate as well as to move axially in the housing for effecting relatively even distribution of such crops to the track substantially throughout its annular extent; said feed opening having a lower edge adjacent to the bottom of the housing; and external feeding means including a bottom wall leading to said feed opening lower edge, said fixed elements having portions at said lower edge disposed in spaced apart relation axis-wise of the housing, and means disposed in overlying relation to said bottom wall, including members spaced apart on the order of and alined respectively with said fixed element portions so as to divide incoming crops.

5. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; means in the housing operative to move crops axially from the feed opening to the track; means on the support means for feeding crops to the feed opening; means cooperative with the feeding means for splitting the crops fed to the housing into separate streams; and means in the housing operative to move such crop streams axially and circumferentially of the housing to different circumferential portions of the track.

6. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; means for introducing crops to the feed opening; means in the housing operative to move crops axially from the feed opening to the track; and means in the housing extending from the feed opening to the track and operative to split the crops into axially separated streams and to move such crop streams axially and circumferentially of the housing to different circumferential portions of the track.

References Cited
UNITED STATES PATENTS

| | | | |
|---|---|---|---|
| 833,422 | 10/1906 | Shaw | 146—188 |
| 480,002 | 8/1892 | Woodruff | 146—190 |
| 591,575 | 10/1897 | Snow | 146—191 |
| 2,240,660 | 5/1941 | Meakin | 107—8 |
| 2,798,444 | 7/1957 | Meakin. | |
| 3,063,361 | 11/1962 | Gehrke. | |
| 2,063,404 | 12/1936 | Selman. | |
| 2,160,302 | 5/1939 | Billows. | |
| 2,870,481 | 1/1959 | Bonnafoux | 18—12 |
| 3,017,945 | 1/1962 | Bonnafoux | 107—14 |
| 3,045,280 | 7/1962 | Bonnafoux | 107—14 |
| 3,327,653 | 6/1967 | Crane | 107—14 |

FOREIGN PATENTS

| | | |
|---|---|---|
| 1,250,174 | 11/1960 | France. |
| 20,970 | 7/1930 | Australia. |
| 657,337 | 9/1951 | Great Britain. |

OTHER REFERENCES

Agricultural Engineering, August 1961, 56–1, pp. 412–415 and 423.

BILLY J. WILHITE, *Primary Examiner.*